United States Patent [19]

Kondo et al.

[11] Patent Number: 4,804,726

[45] Date of Patent: Feb. 14, 1989

[54] MANUFACTURING METHOD OF POLYOLEFIN

[75] Inventors: Yozo Kondo, Yokkaichi; Mitsuhiro Mori, Aichi; Morihiko Sato, Yokkaichi; Toshikazu Chikusa, Yokkaichi; Hitoshi Ito, Yokkaichi, all of Japan

[73] Assignee: Ioyo Soda Manufacturing Co., Ltd., Shinnanyo, Japan

[21] Appl. No.: 195,440

[22] Filed: May 16, 1988

Related U.S. Application Data

[63] Continuation of Ser. No. 828,736, Feb. 12, 1986, abandoned, which is a continuation-in-part of Ser. No. 739,058, May 29, 1985, abandoned.

[30] Foreign Application Priority Data

Jun. 11, 1984 [JP]  Japan .............................. 59-118120

[51] Int. Cl.$^4$ ........................... C08F 4/64; C08F 10/00
[52] U.S. Cl. ..................................... 526/124; 502/125; 526/127; 526/128; 526/348.6; 526/352
[58] Field of Search ...................... 526/124, 127, 128

[56] References Cited

U.S. PATENT DOCUMENTS

| | | | |
|---|---|---|---|
| 4,105,846 | 8/1978 | Hoff et al. ............................ | 526/124 |
| 4,245,071 | 1/1981 | Kondo et al. ........................ | 526/124 |
| 4,292,200 | 9/1981 | Berger et al. ........................ | 526/125 |
| 4,429,087 | 1/1984 | Capshew ............................. | 526/124 |

FOREIGN PATENT DOCUMENTS 155205  12/1981  Japan .

Primary Examiner—Edward J. Smith
Attorney, Agent, or Firm—Oblon, Fisher, Spivak, McClelland & Maier

[57] ABSTRACT

A manufacturing method of polyolefin characterized in that at least one kind of olefins is allowed to polymerize in the presence of a catalyst system comprising (A) solid catalyst ingredient (A) obtained through the successive reaction steps, wherein, with a homogeneous solution involving
  (i) at least one member selected from metallic magnesium and hydroxylated organic compounds and oxygen-containing organic compounds of magnesium, and
  (ii) at least one kind of oxygen-containing organic compounds of titanium, are allowed to react in sequence with:
  (iii) at least one kind of organoaluminum compounds, then
  (iv) at least one kind of silicon compounds and further
  (V) at least one kind of halogenated aluminum compounds and
(B) at least one kind of catalyst ingredients (B) selected from organometallic compounds, the metal of which belongs to Ia, IIa, IIb, IIIb or IVb group in the periodic table.

11 Claims, No Drawings

MANUFACTURING METHOD OF POLYOLEFIN

This application is a continuation of application Ser. No. 828,736, filed on Feb. 12, 1986, now abandoned, which is a continuation-in-part of prior copending application Ser. No. 739,058, filed May 29, 1985, now abandoned.

DETAILED DESCRIPTION OF THE INVENTION

[Applicable field in the industry]

The present invention relates to a manufacturing method of polyolefin comprising allowing at least one kind of olefins to polymerize in the presence of a novel catalyst system.

[Conventional techniques]

It has already been known to use the catalyst system comprising transition metal compound and organometallic compound for the low-pressure polymerization of olefins. Moreover, the catalyst system which involves the reaction product of inorganic or organic magnesium compound with transition metal compound as a ingredient is also known as a high-activity type catalyst.

In Japanese Patent Publication No. 15110/1977 and No. 27677/1977, polymerization methods capable of manufacturing the polyolefins having an extremely high impact resistance were disclosed, wherein the catalyst systems with an extremely high activity comprising catalyst ingredient (A) obtained by allowing magnesium metal and hydroxylated organic compounds or oxygen-containing organic compounds of magnesium, etc., oxygen-containing organic compounds of transition metals and aluminum halide to react, and catalyst ingredient (B) of organometallic compounds were used.

However, the polymer particles obtained in the presence of these catalysts contained a high ratio of fine particles in them due to smaller average diameter of particles or wider-distribution of particle size, and the powder characteristics were still insufficient.

Namely, when manufacturing the polyolefin, if the polymer particles have a particle size distribution as described above, various difficulties may be caused in the processes such as polymerization, particle separation from the polymer slurry, drying of the powder, transference of the powder, etc., and, in some cases, the continuous production over a long period of time may become impossible. Moreover, when polymer is made by the multistage polymerization method, if the particle size distribution of the polymer particles is wide, the classification of the powder is apt to occur at the transportation stage after the drying process and the formulation stage of the additives, and, as the case may be, the adverse effects upon the quality cannot be neglected since the physical properties are different for every particle diameter.

Furthermore, the inventors found that the particle diameter could be made larger by using silicon compounds in addition to the raw materials of catalyst ingredient (A) having been disclosed in Japanese Patent Publication No. 15110/1977, etc. previously. The result was submitted to patent application as Japanese Unexamined Patent Publication No. 155205/1981, but it has not come to the improvement in the particle size distribution.

[Problems to be Solved]

There, as a result of further diligent investigations aimed at the drastic improvement in the powder characterisitics of polymer particles without missing the special feature that polymer having a narrow molecular weight distribution can be manufactured with a high activity of catalyst as disclosed in aforementioned Japanese Patent Publication No. 15110/1977, the inventors have found a fact that the polymer with excellent powder characteristics can be obtained by reducing the homogeneous solution involving magnesium and titanium (hereinafter referred to as Mg-Ti solution), that is, the raw materials of catalyst ingredient (A) disclosed in previous Japanese Patent Publication No. 15110/1977 etc., partially with organoaluminum compounds, and then, with this, by allowing silicon compounds and further halogenated aluminum compounds to react, leading to the completion of the invention.

[Means for the solution]

Namely, the invention states a manufacturing method of polyolefin characterized in that at least one kind of olefins is allowed to polymerize in the presence of a catalyst system comprising
(A) solid catalyst ingredient (A) obtained through the successive reaction steps, wherein, with a homogeneous solution involving
   (i) at least one member selected from metallic magnesium and hydroxylated organic compounds and oxygen-containing organic compounds of magnesium, and
   (ii) at least one kind of oxygen-containing organic compounds of titanium, are allowed
   (iii) at least one kind of organoaluminum compounds, then
   (iv) at least one kind of silicon compounds and further
   (v) at least one kind of halogenated aluminum compounds to react in sequence, and
(B) at least one kind of catalyst ingredients (B) selected from organometallic compounds, the metal of which belongs to Ia, IIa, IIb, IIIb or IVb group in the periodic table.

[Function]

Although the reason is not clear why the solid catalyst ingredient (A) prepared and used in the invention has an excellent property, it is considered that the reaction product obtained by allowing organoaluminum compound (iii) and further silicon compound (iv) to react with Mg-Ti solution plays a role as the nuclei for the formation of particles at the time of the subsequent reaction with halogenated aluminum compound (v) which is carried out for the purpose of the completion of the formation of catalyst particles resulting in making up of the solid catalyst ingredient (A) excellent in the shape of the particles.

The reaction product through the reaction of organoaluminum compound (iii) alone with Mg-Ti solution is of low value as the catalyst ingredient (A). For example, in Japanese Patent Publication No. 15110/1977, it is described that the polymerization activity was not obtained when only trialkylaluminum was allowed to react with the composition involving magnesium and titanium.

It can be said to be a surprising fact that the remarkable effects take place in the invention by allowing organoaluminum compound (iii), silicon compound (iv)

and halogenated aluminum compound (v) to react through three steps with Mg-Ti solution. In particular, excellent powder characteristics are developed by the use of silicon compound.

In the invention, as metallic magnesium and hydroxylated organic compounds and oxygen-containing organic compounds of magnesium described above in (i) which are the reactants to be used for the preparation of the solid catalyst ingredient (A), followings can be mentioned.

First, in the case of using metallic magnesium and hydroxylated organic compounds, as metallic magnesium, all of kinds in the shape such as powder, particle, foil, ribbon or the like can be used, and, as hydroxylated organic compounds, alcohols, organosilanols and phenols are suitable.

As alcohols, straight or branched chain aliphatic alcohols, alicyclic alcohols or aromatic alcohols having carbon atoms of 1 to 18, can be used. For example, methanol, ethanol, n-propanol, i-propanol, n-butanol, i-butanol, n-hexanol, 2-ethyl hexanol, n-octanol, i-octanol, n-stearyl alcohol, cyclopentanol, cyclohexanol, ethylene glycol and the like can be mentioned. Organosilanols are those which have at least one hydroxyl group and the organic group of which is selected from alkyl group, cycloalkyl group, arylalkyl group, aryl group, and alkylaryl group having carbon atoms of 1 to 12. Examples are as follows: trimethylsilanol, triethylsilanol, triphenylsilanol and t-butyldimethylsilanol. Moreover, as phenols, phenol, cresol, xylenol, hydroquinone and the like can be mentioned.

These hydroxylated organic compounds are used independently or as a mixture of more than two. They can be used, of course, independently, but a specific effect may be created sometimes on the powder characteristics of polymer when preferably used as a mixture of more than two.

In addition to this, when the solid catalyst ingredient (A) of the invention is made using metallic magnesium, it is preferable to add one or more than two of substances which can react with metallic magnesium or form an addition compound with it, for example, polar substances such as iodine, mercuric chloride, alkyl halide, organic ester, organic acid and the like for the purpose of promoting the reaction.

Next, as the compounds which belong to oxygen-containing compounds of magnesium, magnesium alkoxides, for example, methylate, ethylate, isopropylate, decanolate, methoxylethylate and cyclohexanolate, magnesium alkyl alkoxides, for example, ethyl ethylate, magnesium hydroalkoxides, for example, hydroxymethylate, magnesium phenoxides, for example, phenate, naphthenate, phenanthrenate and cresolate, magnesium carboxylates, for example, acetate, stearate, benzoate, phenyl acetate, adipate, sebacate, phthalate, acrylate and oleate, oximates, for example, butyl oximate, dimethyl glyoximate and cyclohexyl oximate, salts of hydroxamic acid, salts of hydroxylamine, for example, N-nitroso-N-phenylhydroxylamine derivative, enolates, for example, acetylacetonate, magnesium silanolates, for example triphenyl silanolate, and complex alkoxides with magnesium and other metals, for example, Mg[Al(OC$_2$H$_5$)$_4$]$_2$ can be mentioned. These oxygen-containing organomagnesium compounds are used independently or as a mixture of more than two.

As oxygen-containing organic compounds of titanium which are the reactants described above in (ii), compounds represented by a general formula [Ti-O$_a$(OR$^2$)$_b$]$_m$ are used. However, in said general formula R$^2$ indicates a hydrocarbon group such as straight or branched chain alkyl group, cycloalkyl group, arylalkyl group, aryl group, alkylaryl group having carbon atoms of 1 to 20, preferably 1 to 10, or the like, a and b, which are a$\geq$0 and b$>$0 respectively, indicate numbers as compatible with the valency of titanium, and m indicates a natural number. Particularly, it is desirable to use such oxygen-containing organic compounds as a is 0$\leq$a$\leq$1 and m is 1$\leq$m$\leq$6.

As concrete examples, titanium tetraethoxide, titanium tetra-n-propoxide, titanium tetra-i-propoxide, titanium tetra-n-butoxide, hexa-i-propoxy dititanate and the like can be mentioned. The use of oxygen-containing organic compounds having several different hydrocarbon groups are also included within the range of the invention. These oxygen-containing organic compounds of titanium are used independently or as a mixture of more than two.

As organoaluminum compounds which are the reactants described above in (iii), those which are represented by a general formula R$_3^1$Al or R$_n^1$AlY$_{3-n}$ are used. However, in said general formula, R$^1$ indicates alkyl groups which may be same or different and have carbon atoms of 1 to 20, preferably 1 to 8, Y indicates an alkoxyl group, an aryloxyl group, a cycloalkoxyl group having carbon atoms of 1 to 20, or a halogen atom, and n indicates a number which is 1$\leq$n$<$3.

Organoaluminum compounds described above can be used independently or as a mixture of more than two.

As concrete examples of the organoaluminum compound, triethylaluminum, tri-i-butylaluminum, diethylaluminum chloride, ethylaluminum sesquichloride, i-butylaluminum dichloride, diethylaluminum ethoxide and the like can be mentioned.

As silicon compounds which are the reactants described above in (iv), polysiloxanes and silanes shown below are used.

As polysiloxanes, siloxane polymers, which have a chain, cyclic or three-dimensional structure and in the molecule of which one or more than two of the repeating units represented by a general formula

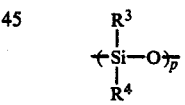

(in the formula, R$^3$ and R$^4$ indicate atoms or residues capable of bonding to silicon such as hydrocarbon groups of alkyl group, aryl group, having carbon atoms of 1 to 12, etc., hydrogen, halogen, alkoxyl group, allyloxyl group, fatty acid residue having carbon atoms of 1 to 12, and the like, R$^3$ and R$^4$ may be same or different, and p indicates normally an integer ranging from 2 to 10,000) are included at various ratios and with various distributions, can be mentioned. However, such cases as all of R$^3$ and R$^4$ are hydrogen atoms or halogen atoms should be excluded.

Concretely, as chain polysiloxanes, for example, hexamethyldisiloxane, octamethyltrisiloxane, dimethylpolysiloxane, diethylpolysiloxane, methylethylpolysiloxane, methylhydropolysiloxane, ethylhydropolysiloxane, butylhydropolysiloxane, hexaphenyldisiloxane, octaphenyltrisiloxane, diphenylpolysiloxane, phenylhydropolysiloxane, methylphenylpolysiloxane, 1,5-dichlorohexamethyltrisiloxane, 1,7-dichlorooctamethyltetrasiloxane, dimethoxylpolysiloxane, diethoxylpolysiloxane, diphenoxylpolysiloxane and the like can be mentioned.

As cyclic polysiloxanes, for example, hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane, triphenyltrimethylcyclotrisiloxane, tetraphenyltetramethylcyclotetrasiloxane, hexaphenylcyclotrisiloxane, octaphenylcyclotetrasiloxane and the like can be mentioned.

As polysiloxanes having a three-dimensional structure, for example, those in which chain or cyclic polysiloxanes described above were arranged by heating, etc. so as to have a crosslinking structure can be mentioned.

Such polysiloxanes are preferable to be liquid state from a standpoint of handling and to have a viscosity of 1 to 10,000 centistokes, preferably 1 to 1000 centistokes at 25° C. However, they are not necessarily confined to the liquid and may be solid matters as called silicone grease collectively.

As silanes, silicon compounds represented by a general formula $H_q Si_r R_s^5 X_t$ (in the formula, $R^5$s indicate groups capable of bonding to silicon such as alkyl group, aryl group, alkoxyl group, allyloxyl group, fatty acid residue having carbon atoms of 1 to 12, and the like, respective $R^5$s may be of different kinds with each other or of same kind, Xs indicate halogen atoms which may be of different kinds with each other of same kind, q, s and t are integers not smaller than 0, and r is a natural number which is connected with q, s and t as $q+s+t=2r+2$) can be mentioned.

Concretely, for example, silahydrocarbons such as trimethylphenylsilane, allyltrimethylsilane, etc., chain and cyclic organosilanes such as hexamethyldisilane, octaphenylcyclotetrasilane, etc., organosilanes such as methylsilane, dimethylsilane, trimethylsilane, etc., halogenated silicons such as silicon tetrachloride, silicon tetrabromide, etc., alkyl- and aryl-halogenosilane such as dimethyldichlorosilane, diethyldichlorosilane, n-butyltrichlorosilane, diphenyldichlorosilane, triethylfluorosilane, dimethyldibromosilane, etc., alkoxylsilanes such as trimethylmethoxylsilane, dimethyldiethoxylsilane, tetramethoxylsilane, diphenyldiethoxylsilane, tetramethyldiethoxyldisilane, dimethyltetraethoxyldisilane, etc., haloalkoxyl- and phenoxyl-silane such as dichlorodiethoxylsilane, dichlorodiphenoxylsilane, tribromoethoxylsilane, etc., silane compounds containing fatty acid residue such as trimethylacetoxysilane, diethyldiacetoxysilane, ethyltriacetoxysilane, etc. and the like can be mentioned.

Organosilicon compounds described above may be used independently or may be used after allowed more than two of them to mix or react.

As halogenated aluminum compounds which are the reactants described above in (v), those represented by a general formula $R_z^6 AlX_{3-z}$ are used. However, in said general formula, $R^6$ indicates a hydrocarbon group having carbon atoms of 1 to 20, preferably 1 to 8, X indicates a halogen atom, and z indicates a number which is $0 \leq z < 3$, preferably $0 \leq z \leq 2$. Moreover $R^6$ is preferable to be selected from straight or branched chain alkyl group, cycloalkyl group, arylalkyl group, aryl group and alkylaryl group.

Halogenated aluminum compounds described above can be used independently or as a mixture of more than two.

As concrete examples of halogenated aluminum compound, for example, aluminum trichloride, diethylaluminum chloride, ethylaluminum dichloride, i-butylaluminum dichloride, a mixture of triethylaluminum and aluminum trichloride and the like can be mentioned.

The solid catalyst ingredient (A) to be used in the invention can be prepared by allowing, with the reaction product obtained through the reaction between aforementioned reactants (i) and (ii), the reactant (iii), then the reactant (iv) and further the reactant (v) to react in sequence.

It is preferable to conduct these reactions in the liquid medium. For the sake of this, the reactions should be conducted in the presence of inert organic solvents particularly when these reactants themselves are not liquid under the operating conditions or when the amounts of the liquid reactants are not ample. As the inert organic solvents, all of ones which are used ordinarily in the technical field concerned can be used, but aliphatic, alicyclic or aromatic hydrocarbons, halogenated derivatives thereof, or the mixtures thereof can be mentioned. For example, isobutane, hexane, heptane, cyclohexane, benzene, toluene, xylene, monochlorobenzene and the like can be used preferably.

The amounts of the reactants to be used in the invention are not particularly confined, but the atomic ratio of gram atomic ratio of gram atom of Mg in the magnesium compounds described above in (i) to gram atom of Ti in the titanium compounds described above in (ii) is $1/20 \leq Mg/Ti \leq 200$, preferably $1/5 \leq Mg/Ti \leq 100$. If Mg/Ti is too large out of this range, it becomes difficult to obtain homogeneous Mg-Ti solution at the time of the catalyst preparation or the activity of catalyst becomes low at the time of the polymerization. Inversely, if it is too small, the activity of the catalyst also becomes low resulting in the problems such as the coloring of product etc.

It is preferable to select the amount of organoaluminum compounds so as to lie the atomic ratio of gram atom of Al in the organoaluminum compounds $R_3^1 Al$ or $R_n^1 AlY_{3-n}$ (in said formula, n is $1 \leq n < 3$) described above in (iii) (hereinafter referred to as Al (iii) multiplied by n (in the case of $R_3^1 Al$, this is gram atom of Al $\times 3$) to gram atom of Ti in the titanium compounds described above in (ii) within a range of $$\frac{1}{10} \times \frac{n}{n - 0.5} \leq \frac{n \times Al(iii)}{Ti} \leq 100 \times \frac{n}{n - 0.5},$$

$$\text{preferably } \frac{1}{2} \times \frac{n}{n - 0.5} \leq \frac{n \times Al(iii)}{Ti} \leq 50 \times \frac{n}{n - 0.5}$$

$$\text{If } \frac{n \times Al(iii)}{Ti}$$

is too large out of this range, the activity of the catalyst becomes low, and, if it is too small, a result is incurred that the improvement in the powder characteristics cannot be aimed.

It is preferable to select the amount of silicon compounds so as to lie the atomic ratio of gram atom of Mg in the magnesium compounds described above in (i) to gram atom of Si in the silicon compounds described above in (iv) within a range of $1/20 \leq Mg/Si \leq 100$, preferably $1/5 \leq Mg/Si \leq 10$. If Mg/Si is too large out of this range, the improvement in the powder characteristics is insufficient. Inversely, if it is too small, a result is incurred that the activity of the catalyst is low.

It is preferable to select the amount of halogenated aluminum compounds described above in (v) so as to lie the atomic ratio of gram atom of Al in the aforementioned organoaluminum compounds (iii) (Al(iii)) to gram atom of Al in the halogenated aluminum compounds (v) (hereinafter referred to as Al(v)) within a range of $1/20 \leq Al(iii)/Al(v) \leq 10$ and to be $\frac{1}{2} \leq p$ (however, $$p = \frac{X}{4 \times Ti + 2 \times Mg + s},$$

wherein Ti and X indicate gram atoms of titanium and halogen, respectively, Mg indicates gram atom of metallic magnesium or that of Mg in the magnesium compounds and s indicates gram equivalent of alkoxyl group or allyloxyl group in the silicon compounds), preferably to be the atomic ratio $1/10 \leq Al(iii)/Al(v) \leq 5$ and $4/5 \leq p$. If the atomic ratio Al(iii)/Al(v) is out of this range, a result is incurred that the improvement in the powder characteristics cannot be aimed, and, if p is too small, the activity of the catalyst becomes low.

The reaction conditions at respective steps are not particularly critical, but the reactions are conducted at a temperature ranging from $-50°$ to $300°$ C., preferably from $0°$ to $200°$ C., for 0.5 to 50 hours, preferably 1 to 6 hours in an atmosphere of inert gas under the normal or applied pressure.

The solid catalyst ingredient (A) thus obtained may be used as it is. But, it is used generally in a form of suspension within the inert organic solvent after filtered or decanted to remove the unreacted matters and by-products remained behind and washed several times with the inert organic solvent. One from which the inert organic solvent was removed by isolating after washing and heating under the normal or reduced pressure can also be used.

In the invention, as the organometallic compounds of the metal belonging to Ia, IIa, IIb, IIIb or IV6 group in the periodic table which are the catalyst ingredients (B), organometallic compounds consisting of metals such as lithium, magnesium, zinc, tin, aluminium, etc. and organic groups, can be mentioned.

As the organic groups described above, alkyl groups can be mentioned typically. As such alkyl groups, straight or branched chain alkyl groups having carbon atoms of 1 to 20 are used. Concretely, for example, n-butyllithium, diethylmagnesium, diethylzinc, trimethylaluminum, triethylaluminum, tri-i-butylaluminum, tri-n-butylaluminum, tri-n-decylaluminum, tetraethyltin, tetrabutyltin and the like can be mentioned. In particular, the use of trialkylaluminum is preferable, which has straight or branched chain alkyl groups having carbon atoms of 1 to 10.

In addition to these, as the ingredients (B), alkylmetal hydrides which have alkyl groups having carbon atoms of 1 to 20 can be used. As such compounds, diisobutylaluminum hydride, trimethyltin hydride and the like can be mentioned concretely. Moreover, alkylmetal halides which have alkyl groups having carbon atoms of 1 to 20, for example, ethylaluminum sesquichloride, diethylaluminum chloride and diisobutylaluminum chloride, alkylmetal alkoxides which have alkoxy groups having carbon atom of 1 to 20, for example, diethylaluminum ethoxide, or the like can be used.

Besides organoaluminum compounds obtained through the reaction of trialkylaluminum or dialkylaluminum hydride which has alkyl groups having carbon atoms of 1 to 20 with diolefin having carbon atoms of 4 to 20, for example, compounds as isoprenylaluminum can also be used. These organometallic compounds are used independently or in the combination of more than two.

The polymerization of olefin according to the invention can be carried out under the general reaction conditions used by the so-called Ziegler method. Namely, polymerization is carried out at a temperature of 20° to 110° C. in the continuous or batch system. The polymerization pressure is not particularly confined, but the application of pressure, in particular, the use of 1.5 to 50 kg/cm²G is suitable. The polymerization is carried out in the presence or in the absence of the inert solvent. As the cases of the absence of inert solvent, so-called vapor phase polymerization, bulk polymerization, etc. are mentioned. When the polymerization is carried out in the presence of inert solvent, everyone used ordinarily can be used as the inert solvent. Particularly, alkanes having carbon atoms of 4 to 20 or cycloalkanes, for example, isobutane, pentane, hexane, cyclohexane and the like are suitable.

The polymerization may be conducted through the single polymerization system, but the effect is particularly exerted by the adoption of multistage polymerizaation system. The multistage polymerization system called so here means the system manufacturing through a plurality of polymerization processes consisting of a process to obtain the polymer of relatively low molecular weight component and a process to obtain that of relatively high molecular weight component. A proper example of such multistage polymerization is exhibited minutely in Japanese Unexamined Patent Publication No. 161405/1981. Namely, for example, at prestage, at least two polymerization processes, one allowing to form high molecular weight polymer and the other allowing to form low molecular weight polymer, are carried out in parallel. Following this, at poststage, the reaction mixtures containing the polymers formed in respective prestage polymerization processes and remaining as they are mixed together to make a new united reaction mixture and, in the presence thereof, the polymerization process allowing to form the polymer having a molecular weight which resides in the center of those of polymers formed in respective polymerization processes aforementioned is carried out. Moreover, for example, it is also possible that high molecular weight component is formed in the poststage process after the formation of low molecular weight component in the prestage process, or inversely, that low molecular weight component is formed after the formation of high molecular weight component.

Upon putting the invention into practice, the amount of the catalyst ingredient (A) to be used is preferable to be equivalent to 0.001 to 2.5 mmol of titanium atom per 1 l of the solvent or per 1 l of the reactor, and it can also be raised to higher concentration depending on the conditions.

The organometallic compound which is the ingredient(B) is used at a concentration of 0.02 to 50 mmol, preferably 0.2 to 5 mmol per 1 l of the solvent or per 1 l of the reactor.

In the manufacturing method of polyolefin according to the invention, as olefins to be allowed to polymerize, α-olefins represented by a general formula $R-CH=CH_2$ (in the formula, R indicates hydrogen or a straight or branched chain, substituted or unsubstituted alkyl group having carbon atoms of 1 to 10, in particular, 1 to 8) can be mentioned. Concretely, ethylene, propylene, 1-butene, 1-pentene, 4-methyl-1-pentene, 1-octene and the like are mentioned. Moreover, copolymerization can also be carried out using mixtures of more than two of α-olefins described above or mixtures of α-olefin with dienes such as butadiene, isoprene, etc. In particular, it is preferable to use ethylene, mixtures of ethylene with aforementioned α-olefins except ethylene, or mixtures of ethylene with dienes.

In the invention, the molecular weight of the formed polymer can be controlled by the publicly known methods, that is, allowing proper amount of hydrogen to exist in the reaction system, etc.

The concentration of hydrogen to control the molecular weight is 0.001 to 20 ordinarily to the concentration of olefin when expressed as a ratio, partial pressure of hydrogen/partial pressure of olefin. Particularly, at the time of the multistage polymerization, it is selected to be 0.01 to 20 in the process of low molecular weight component and 0 to 0.1 in the process of high molecular weight component. Here, it is necessary to select the molecular weights of both low molecular weight component and high molecular weight component aiming at that the average molecular weight of them is consistent with that of object polymer and that the difference of molecular weights of them meets the width of the molecular weight distribution of object polymer.

[Effects of the invention]

The effect of the invention is first focused into a point that the powder characteristics are remarkable. Namely, according to the invention, polymer with high bulk density can be obtained which has also an extremely narrow particle size distribution, contains only small amounts of fine particles and further has an average particle diameter of preferable size. These facts are of great significance industrially. In other words, in the polymerization process, the formation of the deposits is hindered in the polymerization reactor and in the processes of separation and drying of polymer, the scattering of the fine particles of polymer to outside of system is prevented as well as the separation and the filtration of polymer slurry become easy. In addition, the drying efficiency is enhanced due to the improvement in the fluidity. Moreover, at the transportation stage, the bridging, etc. do not occur in the silo and the troubles on transference are dissolved. Furthermore, it becomes possible to supply the polymer with constant quality. Moreover, if the particle size of polymer particles is narrow, the classification of particles is difficult to occur and uniform particles can be obtained resulting in less gels and fish eyes in the moulded articles, particularly when the polymer with a wide molecular weight distribution is formed by the multistage polymerization method.

The second effect of the invention is to be able to make the distribution of molecular weight narrower. As a result, polymer having a high impact strength can be obtained.

The third effect of the invention lies in a high catalyst activity, that is, the weight of polymer obtained per unit weight of the solid catalyst ingredient (A) is markedly high. Therefore, it is unnecessary to remove the catalyst residue from the polymer by taking special measures, and the problems such as deterioration, coloring, etc. can be avoided at the time of the molding of polymer.

[EXAMPLES]

In following, the invention is illustrated using examples, but the invention is not confined to these examples in any way. In examples and comparative examples, HLMI/MI means a ratio of high load melt index (HLMI, in accordance with the condition F in ASTM D-1238) to melt index (MI, in accordance with the condition E in ASTM D-1238). If the value of HLMI/MI is small, the molecular weight distribution is considered to the narrow.

The activity indicates the formation weight (g) of the polymer per 1 g of the solid catalyst ingredient (A). The extent of the particle diameter distribution of polymer particles is expressed by the common logarithm of geometric standard deviation (hereinafter referred to as $\sigma$) obtained by the publicly known method from the approximate straight line through the points plotted the result of the classification of polymer particles with sieves on the probability logarithm paper. Moreover, the average particle diameter is a value read off the particle diameter corresponding to 50% cumulative value in weight with which above-mentioned approximate straight line intersects.

EXAMPLE 1

(a) [Preparation of the solid catalyst ingredient (A)]

In 1.6 l autoclave fitted with a stirring device were placed 70 g (0.94 mol) of n-butanol, and to this were added 0.55 g of iodine, 11 g (0.45 mol) of metallic magnesium powder and 61 g (0.18 mol) of titanium tetrabutoxide. After added 450 ml of hexane further, the temperature was raised to 80° C., and mixture was stirred for 1 hour under sealing with nitrogen excluding hydrogen generated. Without a break, the temperature was raised to 120° C., and the reaction was conducted for 1 hour to obtain Mg-Ti solution.

To a flask of an inner volume of 500 ml were added 0.048 mol in terms of Mg of Mg-Ti solution, and, after raised the temperature to 45° C., a solution of tri-i-butylaluminum (0.048 mol) dissolved into hexane was added over 1 hour, Following to the addition of all of the solution, the mixture was stirred for 1 hour at 60° C. Then, to this were added 2.8 ml (0.048 gram atom of silicon) of methylhydropolysiloxane (viscosity of about 30 centistokes at 25° C.), and the reaction was conducted for 1 hour under refluxing. After cooled to 45° C., 82 ml of 50% hexane solution of i-butylaluminum dichloride were added over 2 hours. After all of the solution were added, the mixture was stirred for 1 hour at 70° C. To the product was added hexane, and the product was washed 15 times by the decantation method. In this way, a slurry of the solid catalyst ingredient (A) (contains 9.5 g of solid catalyst ingredient (A)) suspended into hexane was obtained. A portion of the slurry was sampled and dried under an atmosphere of nitrogen after removed the supernatant. From the elemental analysis of this, Ti was found to be 9.0 wt. %.

(b) [Polymerization of ethylene]

After substituted sufficiently with nitrogen, in a stainless steel autoclave of an inner value of 2 l fitted with an electro-magnetic stirrer were charged 1.2 l of hexane, and the inner temperature was adjusted to 80° C. Subsequently, 0.23 g (1.2 mmol) of tri-i-butylaluminum which is the catalyst ingredient (B) and the slurry obtained in (a) described above which contains 14 mg of the solid catalyst ingredient (A) were added in turn. After controlled the inner pressure of the autoclave to 1 kg/cm²G, hydrogen was added in amounts corresponding to 4 kg/cm², and then, adding ethylene continuously so as to make the inner pressure of the autoclave 11.0 kg/cm²G, polymerization was conducted for 1.5 hours. After the completion of polymerization, the system was cooled and unreacted gas was purged. Polyethylene taken out was separated from the solvent by filtration and dried.

As a result, 280 g of polyethylene having a melt index of 0.45 g/10 min, a ratio of HLMI/MI of 37 and a bulk density of 0.39 g/cm³ was obtained. The formation weight per 1 g of the solid catalyst ingredient (A) (hereinafter referred to as activity) corresponded to 20000 g/g. Moreover, the average particle diameter was 215μ, the ratio of fine particles, the particle diameter thereof being less than 105μ (hereinafter referred to as content of fine particles), was 0.6 wt. %, and σ was 0.08.

EXAMPLE 2 AND 3

Mg-Ti solution, tri-i-butylaluminum, methylhydropolysiloxane and i-butylaluminum dichloride were allowed to react by the similar method to that in Example 1 (a) to prepare the solid catalyst ingredients (A), except that the amounts in Example 1 (a) were varied as shown in Table 1.

Using respective solid catalyst ingredients (A) thus obtained and tri-i-butylaluminum, ethylene was polymerized under the similar conditions to those in Example 1 (b). Results are shown in Table 1.

EXAMPLE 4 THROUGH 9

In place of tri-i-butylaluminum used in Example 1 (a), diethylaluminum chloride, i-butylaluminum dichloride, ethylaluminum dichloride, ethylaluminum sesquichloride and diethylaluminum ethoxide were used in Example 4 and Example 5, Example 6, Example 7, Example 8, and Example 9, respectively, to allow to react by the similar method to that in Example 1 (a) and prepare the solid catalyst ingredients (A), except that the amounts used were those shown together with other reactants in Table 1.

Using respective solid catalyst ingredients (A) thus obtained and tri-i-butylaluminum, ethylene was polymerized under the similar conditions to those in Example 1 (b). Results are shown Table 1.

COMPARATIVE EXAMPLE 1

In 500 ml flask were placed 0.052 mol in terms of Mg of Mg-Ti solution obtained in Example 1 (a), and the temperature was raised to 45° C. To this were added 116 ml of 50% hexane solution of i-butylaluminum dichloride over 2 hours. After added all of the solution, the temperature was raised, and the mixture was stirred for 1 hour at 70° C.

Hexane was added to the product, and the product was washed 15 times by the decantation method. In this way, a slurry of the solid catalyst ingredient (A) suspended into hexane was obtained. As a result of the elemental analysis, titanium was found to be 10.7 wt. %.

Using 0.23 g of tri-i-butylaluminum and 15 mg of the solid catalyst ingredient (A) obtained by the abovementioned method, ethylene was polymerized under the similar conditions to those in Example 1 (b).

The activity was 16,000 g/g and the bulk density was 0.34 g/cm³. However, as compared with respective examples, the average particle diameter was as small as 95μ, the content of fine particles was as rich as 55.7 wt. %, and further, σ was as large as 0.56 showing the unevenness of particles.

COMPARATIVE EXAMPLE 2

After obtained Mg-Ti solution under the similar conditions to those in Example 1 (a), 26 ml (0.45 gram atom of silicon) of methylhydropolysiloxane (viscosity of about 30 centistokes at 25° C.) were introduced further at 120° C. under the pressure with nitrogen, and the reaction was conducted for 1 hour at 120° C. to obtain the reaction product.

A portion of the aforementioned reaction product (corresponding to 0.053 mol in terms of Mg and 0.053 gram atom of Si) was placed in 500 ml flask, and the temperature was raised to 45° C. To this were added 108 ml of 50% hexane solution of i-butylaluminum dichloride over 2 hours. After the completion of addition, temperature was raised, and the mixture was stirred for 1 hour at 70° C.

To the product was added hexane, and the product was washed 15 times by the decantation method. Thus, a slurry of the solid catalyst ingredient (A) suspended into hexane was obtained.

Using 0.23 g of tri-i-butylaluminum and 15 mg of the solid catalyst ingredient (A), ethylene was polymerized under similar conditions to those in Example 1 (b). As a result, comparing with respective examples, the content of fine particles was as rich as 12.4 wt. %, σ was also as large as 0.47 and particles were uneven.

EXAMPLE 10 THROUGH 13

Except that 37 g (0.50 mol) of n-butanol and 30 g (0.50 mol) of i-propanol, 23 g (0.50 mol) of ethanol and 30 g (0.50 mol) of i-propanol, 51 g (0.50 mol) of n-hexanol and 27 g (0.45 mol) of i-propanol, and 37 g (0.50 ml) of n-butanol and 50 g (0.50 mol) of cyclohexanol were used in Example 10, Example 11, Example 12 and Example 13, respectively, in place of n-butanol used in Example 1 (a), the solid catalyst ingredients (A) were prepared by the similar method to that in Example 5.

Using respective solid catalyst ingredients (A) thus obtained and tri-i-butylaluminum, ethylene was polymerized under the similar conditions to those in Example 1 (b). Result are shown in Table 2.

COMPARATIVE EXAMPLE 3

In 500 ml flask were placed 0.048 mol in terms of Mg of Mg-Ti solution obtained in Example 10, and the temperature was raised to 45° C. To this were added 107 ml of 50% hexane solution of i-butylaluminum dichloride over 2 hours. After the completion of addition, the temperature was raised, and the mixture was stirred for 1 hour at 70° C.

To the product was added hexane, and the product was washed 15 times by the decantation method. Thus, a slurry of the solid catalyst ingredient (A) suspended into hexane was obtained.

Using the solid catalyst ingredient (A) obtained and tri-i-butylaluminum, ethylene was polymerized under the similar conditions to those in Example 1 (b). Consequently, the content of fine particles was richer and σ was also larger compared with respective examples.

TABLE 2

| | Alcohol used for preparation of Mg—Ti solution | Result of polymerization of ethylene | | | | | | | | |
|---|---|---|---|---|---|---|---|---|---|---|
| | | Solid catalyst ingredient (A) (mg) | Catalyst ingredient (B) (g) | Yield (g) | Activity (g/g) | MI (g/10 min.) | HLMI/MI | Bulk density (g/cm³) | Content of fine particles (wt. %) | σ | Average particle diameter (μ) |
| Example 10 | n-Butanol i-Propanol | 10 | Tri-i-butyl-aluminum 0.23 | 258 | 25,800 | 0.20 | 56 | 0.38 | 0.8 | 0.08 | 300 |
| Example 11 | Ethanol i-Propanol | 10 | Tri-i-butyl-aluminum 0.23 | 332 | 33,200 | 0.22 | 55 | 0.37 | 1.2 | 0.24 | 300 |
| Example 12 | n-Hexanol i-Propanol | 10 | Tri-i-butyl-aluminum 0.23 | 222 | 22,200 | 0.26 | 48 | 0.36 | 9.2 | 0.20 | 220 |
| Example 13 | n-Butanol Cyclohexanol | 10 | Tri-i-butyl-aluminum 0.23 | 253 | 25,300 | 0.29 | 44 | 0.36 | 9.3 | 0.14 | 225 |
| Comparative example 3 | n-Butanol i-Propanol | 10 | Tri-i-butyl-aluminum 0.23 | 175 | 17,500 | 0.31 | 53 | 0.33 | 13.4 | 0.41 | 280 |

EXAMPLE 14 THROUGH 17

Using Mg-Ti solution obtained in Example 10, various silicon conpounds were employed in place of methylhydropolysiloxane.

Namely, exept that dimethylpolysiloxane (viscosity of 50 centistokes at 25° C.), methylphenylpolysiloxane (viscosity of 500 centistokes at 25° C.), diphenyldiethoxysilane and silicon tetrachloride were used in Example 14, Example 15, Example 16 and Example 17, respectively, the reactions were conducted by the similar method to that in Example 10 to prepare the solid catalyst ingredients (A).

Using respective solid catalyst ingredients (A) thus obtained and tri-i-butylaluminum, ethylene was polymerized under the similar conditions to those in Example 1 (b). Results are shown in Table 3.

varied to 37 g (0.11 mol) and 140 g (0.41 mol) in Example 18 and Example 19, respectively. All of the other conditions relating to the manufacture of the solid catalyst ingredients (A) were kept similar to those in Example 10 for the reactions to obtain Mg-Ti solutions.

In Example 18, to a flask having an inner volume of 500 ml were added 0.048 mol in terms of Mg of aforementioned Mg-Ti solution, and diethylaluminum chloride (0.096 mol), methylhydropolysiloxane (0.096 gram atom of silicon) and i-butylaluminum dichloride (0.26 mol) were allowed to react in the same manner as in Example 10 to prepare the solid catalyst ingredient (A).

In Example 19, to a flask having an inner volume of 500 ml were added 0.042 mol in terms of Mg of aforementioned Mg-Ti solution, and diethylaluminum chloride (0.084 mol), methylhydropolysiloxane (0.084 gram atom of silicon) and i-butylaluminum dichloride (0.23

TABLE 3

| | Silicon compound | Result of polymerization of ethylene | | | | | | | | |
|---|---|---|---|---|---|---|---|---|---|---|
| | | Solid catalyst ingredient (A) (mg) | Catalyst ingredient (B) (g) | Yield (g) | Activity (g/g) | MI (g/10 min.) | HLMI/MI | Bulk density (g/cm³) | Content of fine particles (wt. %) | σ | Average particle diameter (μ) |
| Example 14 | Dimethyl-polysiloxane | 10 | Tri-i-butyl-aluminum 0.23 | 248 | 24,800 | 0.37 | 46 | 0.40 | 3.8 | 0.21 | 320 |
| Example 15 | Methylphenyl-polysiloxane | 10 | Tri-i-butyl-aluminum 0.23 | 220 | 22,000 | 0.52 | 42 | 0.37 | 5.0 | 0.22 | 310 |
| Example 16 | Diphenyl-diethoxylsilane | 10 | Tri-i-butyl-aluminum 0.23 | 163 | 16,300 | 0.58 | 32 | 0.37 | 4.7 | 0.16 | 180 |
| Example 17 | Silicon tetrachloride | 10 | Tri-i-butyl-aluminum 0.23 | 222 | 22,200 | 0.19 | 51 | 0.36 | 2.4 | 0.12 | 260 |

EXAMPLE 18 AND 19

The amount of titanium tetrabutoxide used for the manufacture of the solid catalyst ingredient (A) was varied.

Namely, through 61 g (0.18 mol) of titanium tetrabutoxide were used in Example 10, this amount was mol) were allowed to react in the same manner as in Example 10 to prepare the solid catalyst ingredient (A).

Using respective solid catalyst ingredients (A) obtained and tri-i-butylaluminum, ethylene was polymerized under the similar conditions to those in Example 1 (b). Results are shown in Table 4.

TABLE 4

| | Amount in terms of Mg in Mg—Ti solution (mol) | Amount in terms of Ti in Mg—Ti solution (mol) | Solid catalyst ingredient (A) (mg) | Catalyst ingredient (B) (g) | Result of polymerization of ethylene | | | | | | | |
|---|---|---|---|---|---|---|---|---|---|---|---|---|
| | | | | | Yield (g) | Activity (g/g) | MI (g/10 min.) | HLMI/MI | Bulk density (g/cm$^3$) | Content of fine particles (wt. %) | $\sigma$ | Average particle diameter ($\mu$) |
| Example 18 | 0.048 | 0.012 | 10 | Tri-i-butyl-aluminum 0.23 | 365 | 36,500 | 0.47 | 48 | 0.36 | 2.7 | 0.12 | 280 |
| Example 19 | 0.042 | 0.042 | 10 | Tri-i-butyl-aluminum 0.23 | 217 | 21,700 | 0.43 | 38 | 0.40 | 5.2 | 0.28 | 740 |

EXAMPLE 20

To 500 ml flask were added 0.052 mol in terms of Mg of Mg-Ti solution obtained in Example 10 and these were allowed to react with diethylaluminum chloride (0.10 mol) by the similar method to that in Example 1 (a). After the completion of reaction, the temperature was lowered. To the product was added hexane and the product was washed 3 times by the decantation method. Following this, by the similar method to that in Example 1 (a), methylhydropolysiloxane (0.10 gram atom of silicon) and further i-butylaluminum dichloride (0.28 mol) were allowed to react to obtain a slurry of the solid catalyst ingredient (A).

In an autoclave were charged 10 mg of the solid catalyst ingredient (A) obtained and 0.23 g of tri-i-butylaluminum. Hydrogen was added in amounts corresponding to 7.6 kg/cm$^2$ by the similar procedure to that in Example 1 (b) and then, adding ethylene continuously so as to make the inner pressure of the autoclave 20 kg/cm$^2$G, polymerization was conducted for 1.5 hours at 80° C. As a result, 262 g of polyethylene were obtained which had a melt index of 0.20 g/10 min., a ratio HLMI/MI of 61 and a bulk density of 0.42 g/cm$^3$. The activity corresponded to 26200 g/g. Moreover, the average particle diameter was 235$\mu$, the content of fine particles was 1.1 wt. % and $\sigma$ was 0.13.

EXAMPLE 21

Using 15 mg of the solid catalyst ingredient (A) obtained in Example 10 and 0.13 g of triethylaluminum as the catalyst ingredient (B), ethylene was polymerized under the similar conditionis to those in Example 1 (b). Results are shown in Table 5.

EXAMPLE 22

Mg-Ti solution was obtained by the similar procedure to that in Example 1 (a), except that 50 g (0.67 mol) of n-butanol, 88 g (0.67 mol) of 2-ethylhexyl alcohol, 0.75 g of iodine, 15 g (0.62 mol) of metallic magnesium powder and 21 g (0.062 mol) of titanium tetrabutoxide were used as the reactants. Further, using 0.072 mol in terms of Mg of this Mg-Ti solution, diethylaluminum chloride (0.072 mol), methylhydropolysiloxane (0.14 gram atom of silicon) and i-butylaluminum dichloride (0.29 mol), similar procedure was conducted to that in Example 1 (a) to obtain the solid catalyst ingredient (A). As a result of the elemental analysis, titanium was found to be 3.2 wt. %.

In an autoclave were charged 10 mg of the solid catalyst ingredient (A) thus obtained and, as the catalyst ingredients (B), 0.12 g of tri-i-butylaluminum and 0.071 g of diethylaluminum chloride, and the polymerization of ethylene was carried out under similar conditions to those in Example 1 (b). Results are shown in Table 5.

EXAMPLE 23

Using the solid catalyst ingredient (A) obtained in Exmple 10, copolymerization was conducted between ethylene and 1-butane.

After added 0.23 g of tri-i-butylaluminum and 10 mg of the solid catalyst ingredient (A) used in Example 10 to an autoclave by the same procedure as that in Example 1 (b) except that the inner temperature was made 75° C., the inner pressure of the autoclave was adjusted to 1 kg/cm$^2$G. Then, 13 g of 1-butene and hydrogen in amounts corresponding to 1.6 kg/cm$^2$ were added, and further, adding ethylene continuously so as to make the inner pressure of the autoclave 8.2 kg/cm$^2$G, polymerization was initiated. After 1.5 hours, polymerization was stopped by the similar procedure to that in Example 1 (b) to recover the polymer. As a result, 317 g of ethylene copolymer were obtained which had a melt index of 0.16 g/10 min., a ratio HLMI/MI of 46, a density of 0.941 g/cm$^3$ and a bulk density of 0.38 g/cm$^3$. Moreover, the content of fine particles was 2.6 wt. %, the average particle diameter was 260$\mu$ and $\sigma$ was 0.14.

TABLE 5

| | Solid catalyst ingredient (A) (mg) | Catalyst ingredient (B) (g) | Result of polymerization of ethylene | | | | | | | |
|---|---|---|---|---|---|---|---|---|---|---|
| | | | Yield (g) | Activity (g/g) | MI (g/10 min.) | HLMI/MI | Bulk density (g/cm$^3$) | Content of fine particles (wt. %) | $\sigma$ | Average particle diameter ($\mu$) |
| Example 20 | 10 | Tri-i-butyl-aluminum 0.23 | 262 | 26,200 | 0.20 | 61 | 0.42 | 1.1 | 0.13 | 235 |
| Example 21 | 15 | Triethyl-aluminum 0.13 | 234 | 15,600 | 0.13 | 54 | 0.41 | 8.1 | 0.08 | 210 |
| Example 22 | 10 | Tri-i-butyl-aluminum 0.12 Diethylaluminum chloride 0.071 | 365 | 36,500 | 1.10 | 39 | 0.42 | 6.4 | 0.13 | 350 |
| Example 23 | 10 | Tri-i-butyl- | 317 | 31,700 | 0.16 | 46 | 0.38 | 2.6 | 0.14 | 260 |

TABLE 5-continued

| Solid catalyst ingredient (A) (mg) | Catalyst ingredient (B) (g) | Yield (g) | Activity (g/g) | MI (g/10 min.) | HLMI/MI | Bulk density (g/cm$^3$) | Content of fine particles (wt. %) | $\sigma$ | Average particle diameter ($\mu$) |
| --- | --- | --- | --- | --- | --- | --- | --- | --- | --- |
| | aluminum 0.23 | | | | | | | | |

EXAMPLE 24

Polymerization of ethylene was conducted by the multistage polymerization method using solid catalyst ingredient (A) prepared in Example 20. Namely, employing two stainless steel electromagnetic stirring type reactors of an inner volume of 5 l, in one of them were charged 3 l of hexane and, after adjusted the inner temperature to 85° C., 1.7 g (8.5 mmol) of tri-i-butylaluminum which is the catalyst ingredient (B) and 200 mg of the solid catalyst ingredient (A) were added. After adjusted the inner peressure of reactor to 1 kg/cm$^2$ G by nitrogen gas, hydrogen was added in amounts corresponding to a partial pressure of 19.0 Kg/cm$^2$, and further, adding ethylene continuously so as to make the total pressure 25 kg/cm$^2$ G, polymerization was conducted for 65 minutes to manufacture low molecular weight polymer.

In other reactor were charged 3 l of hexane, and 1.7 g (8.8 mmol) of tri-i-butylaluminum and 100 mg of the solid catalyst ingredient (A) were added. After adjusted the inner pressure of reactor to 1 kg/cm$^2$ G by nitrogen gas, hydrogen was added in amounts corresponding to a partial pressure of 0.1 kg/cm$^2$, and further, adding ethylene continuously so as to make the total pressure 4.0 kg/cm$^2$ G, polymerization was conducted for 65 minutes to manufacture high molecular weight polymer.

Then, respective reaction mixtures containing these polymers were fed to a stirring type reactor of an inner volume of 10 l through connecting pipe under pressure. After substituted the gas phase of this reactor with nitrogen, inner temperature and inner pressure were made 80° C. and 1.0 kg/cm$^2$ G, respectively. Hydrogen was added in amounts corresponding to a partial pressure of 1.2 kg/cm$^2$ and further, supplying ethylene continuously so as to make the total pressure 5.2 kg/cm$^2$ G, polymerization was conducted for 45 minutes. The reaction mixture was filtered off and dried. The amount of polymer obtained was 1900 g. Moreover, as a result of getting hold of the amounts formed in respective stages by the flow rate of ethylene, the formation ratios were 40 wt.% for the low molecular weight polymer in prestage, also 40 wt.% for the high molecular weight polymer in same stage and 20 wt.% for poststage, respectively.

The polymer powder obtained was pelletized at a temperature of 200° C. by the use of extruder with a screw diameter of 25 mm$\phi$. MI of this pellet was 0.059 and HLMI/MI was 200. Moreover, this pellet was estimated under the conditions of temperature of resin of 215° C., blow ratio of 4.0 and thickness of film of 30$\mu$ using inflation film-former with a screw diameter of 25 mm$\phi$. In consequence, excellent film without fish eyes was obtained.

EXAMPLE 25

Polymerization of ethylene was conducted by the two-stage polymerization method using solid catalyst ingredient (A) prepared in Example 20.

After substituted sufficiently the inside of a stainless steel electromagnetic stirring type reactor of an inner volume of 10 l with nitrogen, 6.0 l of hexane were charged and the inner temperature was adjusted to 85° C. Thereafter, 1.19 g (6.0 mmol) of tri-i-butylaluminum which is the catalyst ingredient (B) and 150 mg of the solid catalyst ingredient (A) prepared in Example 20 were added in turn. After adjusted the inside of reactor to 1 kg/cm$^2$ G by nitrogen gas, hydrogen was added in amounts corresponding to 16.0 kg/cm$^2$ and ethylene was added continuously so as to make the total pressure 20 kg/cm$^2$ G, while the polymerization was conducted for 60 minutes to manufacture low molecular weight polymer.

Then, the gas phase of this reactor was substituted with nitrogen and the inner temperature and the inner pressure were made 75° C. and 1.0 kg/cm$^2$ G, respectively. Hydrogen was added in amounts corresponding to a partial pressure of 1.0 kg/cm$^2$, and further, supplying ethylene continuously so as to make the total pressure 5.0 kg/cm$^2$ G, polymerization was conducted for 45 minutes. The reaction mixture was filtered off and dried. The amount of polymer obtained was 2080 g. Moreover, as a result of getting hold of the amounts formed in respective stages by the flow rate of ethylene, the formation ratios were 50 wt.% for the low molecular weight polymer in prestage and also 50 wt.% for the high molecular weight polymer in poststage.

The polymer powder obtained was pelletized and converted to film by the similar method to that in Example 24. As a result, MI was was 0.080 and HLMI/MI was 170, and excellent film without fish eyes was otained.

EXAMPLE 26

Using solid catalyst ingredient (A) prepared in Example 20, the polymerization of ethylene was conducted by the two-stage polymerization method under different conditions from those in Example 25. Namely, after substituted sufficiently the inside of a stainless steel electromagnetic stirring type reactor of an inner volume of 10 l with nitrogen, 6.0 l of hexane were charged and the inner temperature was adjusted to 85° C. Thereafter, 1.19 g (6.0 mmol) of tri-i-butylaluminum which is the catalyst ingredient (B) and 150 mg of the solid catalyst ingredient (A) prepared in Example 20 were added in turn. After adjusted the inside of reactor to 1 kg/cm$^2$ G by nitrogen gas, hydrogen was added in amounts corresponding to 10.8 kg/cm$^2$ and, adding ethylene continuously so as to make the total pressure 13.7 kg/cm$^2$ G, polymerization was conducted for 70 minutes to manufacture low molecular weight polymer.

Then, the gas phase of this reactor was substituted with nitrogen and the inner temperature and the inner pressure were made 80° C. and 1.0 kg/cm² G, respectively. Hydrogen was added in amounts corresponding to a partial pressure 0.8 kg/cm² and further, ethylene was supplied continuously so as to make the total pressure 4.5 kg/cm² G, while the polymerization was conducted for 45 minutes to manufacture high molecular weight polymer. The amount of polymer obtained was 1880 g and the formation ratios in respective stages were 50 wt.% for the low molecular weight polymer in prestage and also 50 wt.% for the high molecular weight polymer in poststage.

MI, HLMI/MI and bulk density of polyethylene obtained were 0.46, 90 and 0.37 g/cm³, respectively. After pelletized, this polyethylene was molded to a round bottle of 300 ml by the use of blow molding machine. The molded article was excellent without gels.

| | Manufacture of solid catalyst ingredient (A) | | | | |
|---|---|---|---|---|---|
| | Alcohol used for preparation of Mg—Ti solution | Amount in terms of Mg in Mg—Ti solution (mol) | Organoaluminum compound (mol) | Silicon compound (gram atom of) (silicon) | Halogenated aluminum compound (mol) |
| Example | | | | | |
| 1 | n-Butanol | 0.048 | Tri-i-butyl-aluminum 0.048 | Methylhydro-polysiloxane 0.048 | i-Butylaluminum dichloride 0.22 |
| 2 | n-Butanol | 0.048 | Tri-i-butyl-aluminum 0.048 | Methylhydro-polysiloxane 0.048 | i-Butylaluminum dichloride 0.14 |
| 3 | n-Butanol | 0.048 | Tri-i-butyl-aluminum 0.096 | Methylhydro-polysiloxane 0.048 | i-Butylaluminum dichloride 0.22 |
| 4 | n-Butanol | 0.054 | Diethylaluminum chloride 0.054 | Methylhydro-polysiloxane 0.11 | i-Butylaluminum dichloride 0.19 |
| 5 | n-Butanol | 0.050 | Diethylaluminum chloride 0.10 | Methylhydro-polysiloxane 0.10 | i-Butylaluminum dichloride 0.28 |
| 6 | n-Butanol | 0.054 | i-Butylaluminum dichloride 0.041 | Methylhydro-polysiloxane 0.054 | i-Butylaluminum dichloride 0.24 |
| 7 | n-Butanol | 0.045 | Ethylaluminum dichloride 0.090 | Methylhydro-polysiloxane 0.045 | i-Butylaluminum dichloride 0.090 |
| 8 | n-Butanol | 0.039 | Ethylaluminum sesquichloride 0.058 | Methylhydro-polysiloxane 0.039 | i-Butylaluminum dichloride 0.17 |
| 9 | n-Butanol | 0.046 | Diethylaluminum ethoxide 0.046 | Methylhydro-polysiloxane 0.0046 | i-Butylaluminum dichloride 0.21 |
| Comparative example | | | | | |
| 1 | n-Butanol | 0.052 | — | — | i-Butylaluminum dichloride 0.31 |
| 2 | n-Butanol | 0.053 | — | Methylhydro-polysiloxane *0.053 | i-Butylaluminum dichloride 0.29 |

| | | | Result of polymerization of ethylene | | | | | |
|---|---|---|---|---|---|---|---|---|---|
| | Solid catalyst ingredient (A) (mg) | Catalyst ingredient (B) (g) | Yield (g) | Activity (g/g) | MI (g/10 min) | Bulk density (g/cm³) | Content of fine particles (wt. %) | σ | Average particle diameter (μ) |
| Example | | | | | | | | | |
| 1 | 14 | Tri-i-butyl-aluminum 0.23 | 280 | 20,000 | 0.45 | 0.39 | 0.6 | 0.08 | 215 |
| 2 | 14 | Tri-i-butyl-aluminum 0.23 | 347 | 24,800 | 0.82 | 0.38 | 0.6 | 0.10 | 240 |
| 3 | 14 | Tri-i-butyl-aluminum 0.23 | 160 | 11,400 | 0.30 | 0.35 | 2.8 | 0.19 | 250 |
| 4 | 10 | Tri-i-butyl-aluminum 0.23 | 350 | 35,000 | 0.92 | 0.38 | 3.2 | 0.23 | 870 |
| 5 | 10 | Tri-i-butyl-aluminum 0.23 | 258 | 25,800 | 0.31 | 0.35 | 6.5 | 0.16 | 210 |
| 6 | 15 | Tri-i-butyl-aluminum 0.23 | 324 | 21,600 | 0.32 | 0.40 | 7.8 | 0.20 | 370 |
| 7 | 10 | Tri-i-butyl-aluminum 0.23 | 229 | 22,900 | 0.62 | 0.36 | 2.3 | 0.18 | 490 |

| | | -continued | | | | | | | |
|---|---|---|---|---|---|---|---|---|---|
| 8 | 17 | Tri-i-butyl-aluminum 0.23 | 347 | 20,400 | 0.46 | 0.36 | 6.0 | 0.09 | 200 |
| 9 | 12 | Tri-i-butyl-aluminum 0.23 | 196 | 16,300 | 0.34 | 0.37 | 2.1 | 0.16 | 390 |
| Comparative example | | | | | | | | | |
| 1 | 15 | Tri-i-butyl-aluminum 0.23 | 240 | 16,000 | 0.18 | 0.34 | 55.7 | 0.56 | 95 |
| 2 | 15 | Tri-i-butyl-aluminum 0.23 | 296 | 19,700 | 0.86 | 0.37 | 12.4 | 0.47 | 340 |

*Gram atom of silicon in Mg—Ti solution

What is claimed is:

1. A method for preparing an olefin polymer, which comprises polymerizing an olefin at a temperature of from 20° to 110° C. in a continuous or batch system, in the presence of a catalyst system comprising a combination of ingredients (A) and (B), wherein ingredient (A) is a solid catalyst obtained by allowing a homogeneous solution of
   (i) at least one of a combination of metallic magnesium and a hydroxylated organic compound, or an oxygen-containing organic compound of magnesium, and
   (ii) at least one oxygen-containing organic compound of titanium, to react in succession with:
   (iii) at least one first organoaluminum compound having the formula:
   $R_3^1Al$ or $R_n^1AlY_{3-n}$
   wherein $R^1$ is a $C_{1-20}$ alkyl group, Y is a $C_{1-20}$ alkoxyl, aryloxy or cycloalkoxyl group or a halogen, and $1 \leq n < 3$, wherein, when the first organoaluminum compound has the formula $R_n^1AlY_{3-n}$, the atomic ratio of gram atoms of aluminum in said compound multiplied by n, to the gram atoms of titanium in the titanium compounds falls within a range of $0.1 \times n/(n-0.5) \leq (n \times Al)/Ti \leq 100 \times n/(n-0.5)$ and wherein, when the first organoaluminum compound has the formula $R_3^1Al$ and the atomic ratio of gram atoms of aluminum in said organoaluminum compound multiplied by 3, to the gram atoms of titanium in the titanium compounds falls within a range of $0.12 \leq (3 \times Al)/Ti \leq 120$;

then
   (iv) at least one polysiloxane or silane compound, wherein said polysiloxane has the formula:

wherein $R^3$ and $R^4$ are the same or different and are $C_{1-12}$ alkyl, $C_{1-12}$ aryl, hydrogen, halogen, $C_{1-12}$ alkoxyl, $C_{1-12}$ allyloxyl, or $C_{1-12}$ fatty acid, with the proviso that $R^3$ and $R^4$ cannot both be hydrogen or halogen, and wherein p ranges from about 2 to 10,000; and wherein said silane has the formula:

$H_qSi_rR_s^5X_t$ where $R_s^5$ are groups capable of bonding to silicon which are $C_{1-12}$ alkyl, $C_{1-12}$ aryl, $C_{1-12}$ alkoxyl, $C_{1-12}$ allyloxyl, or $C_{1-12}$ fatty acid; X is halogen; q, s, and t are integers not smaller than 0; and r is a natural number related to q, s and t as $q+s+t=2r+2$, wherein the amount of said polysiloxane or silane compound is selected such that the atomic ratio of gram atoms of magnesium in the magnesium compounds to the gram atoms of silicon in the silicon compounds lies within a range of $1/20 \leq Mg/Si \leq 100$; and then
   (v) at least one second aluminum compound having the formula:

$R_z^6AlX_{3-z}$ wherein $R^6$ is a $C_{1-20}$ hydrocarbon, X is a halogen atom and $0 \leq Z < 3$, wherein the amount of said second aluminum compound is such that the atomic ratio of gram atoms of aluminum in the first organoaluminum compound to the gram atoms of aluminum in the second aluminum compound falls within a range of $1/20 \leq Al$ (first organoaluminum compound)/Al (second aluminum compound) $\leq 10$;
   and ingredient (B) is an organometallic compound containing a metal from group Ia, IIa, IIb, IIIb or IVb of the Periodic Table.

2. The method of claim 1, wherein said oxygen-containing organic compound of titanium is represented by the general formula $[TiO_a(OR^2)_b]_m$ wherein $R^2$ represents a $C_{1-20}$ alkyl group, a $C_{1-20}$ cycloalkyl group, a $C_{1-20}$ arylalkyl group, a $C_{1-20}$ aryl group, a $C_{1-20}$ alkyl aryl group, wherein $a \geq 0$ and $b > 0$, respectively, a and b being compatible with the valency of titanium, and m indicates a natural number.

3. The method of claim 1, wherein said organic compound of titanium is selected from the group consisting of titanium tetraethoxide, titanium tetra-n-propoxide, titanium tetra-i-propoxide, titanium tetra-n-butoxide, and hexa-i-propoxy dititanate.

4. The method of claim 1, wherein said first organoaluminum compound is selected from the group consisting of triethylaluminum, tri-i-butylaluminum, diethylaluminum chloride, ethylaluminum sesquichloride, i- butylaluminum dichloride, and diethylaluminum ethoxide.

5. The method of claim 1, wherein said polysiloxane is selected from the group consisting of hexamethyldisiloxane, octamethyltrisiloxane, dimethylpolysiloxane, diethylpolysiloxane, methylethylpolysiloxane, methylhydropolysiloxane, ethylhydropolysiloxane, butylhydropolysiloxane, hexaphenyldisiloxane, octaphenyltrisiloxane, diphenylpolysiloxane, phenylhydropolysiloxane, methylphenylpolysiloxane, 1,5-dichlorohexamethyltrisiloxane, 1,7-dichlorooctamethyltetrasiloxane, dimethoxylpolysiloxane, diethoxylpolysiloxane, and diphenoxylpolysiloxane.

6. The method of claim 1, wherein said polysiloxane is a cyclic polysiloxane selected from the group consisting of hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane, triphenyltrimethylcyclotrisiloxane, tetraphenyltetramethylcyclotetrasiloxane, hexaphenylcyclotrisiloxane and octaphenylcyclotetrasiloxane.

7. The method of claim 1, wherein said silane is selected from the group consisting of trimethylphenylsilane, allyltrimethylsilane, hexamethyldisilane, octaphenylcyclotetrasilane, methylsilane, dimethylsilane, trimethylsilane, silicon tetrachloride, silicon tetrabromide, dimethyldichlorosilane, diethyldichlorosilane, n-butyltrichlorosilane, diphenyldichlorosilane, triethylfluorosilane, dimethyldibromosilane, trimethylmethoxylsilane, dimethyldiethoxylsilane, tetramethoxylsilane, diphenyldiethoxylsilane, tetramethyldiethoxyldisilane, dimethyltetraethoxyldisilane, dichlorodiethoxylsilane, dichlorodiphenoxylsilane, tribromoethoxylsilane, trimethylacetoxysilane, diethyldiacetoxysilane, and ethyltriacetoxysilane.

8. The method of claim 1, wherein said second aluminum compound is selected from the group consisting of aluminum trichloride, diethylaluminum chloride, ethylaluminum dichloride, i-butylaluminum dichloride, and a mixture of triethylaluminum and aluminum trichloride.

9. The method of claim 1, wherein the atomic ratio of the gram atomic ratio of gram atoms of magnesium in the magnesium compounds to the gram atoms of titanium in the titanium compounds is $1/20 \leq Mg/Ti \leq 200$.

10. The method of claim 1, wherein, in ingredient (B), the metal is selected from the group consisting of lithium, magnesium, zinc, tin, and aluminum.

11. A method for preparing an olefin polymer, which comprises polymerizing an olefin at a temperature of from 20° to 110° C. in a continuous or batch system to obtain at least one relatively low molecular weight polyolefin material and at least one relatively high molecular weight polyolefin material in separate polymerization stages, in the presence of a catalyst system comprising a combination of ingredients (A) and (B), wherein ingredient (A) is a solid catalyst obtained by allowing a homogeneous solution of (i) at least one of a combination of metallic magnesium and a hydroxylated organic compound, or an oxygen-containing organic compound of magnesium, and (ii) at least one oxygen-containing organic compound of titanium, to react in succession with:

(iii) at least one first organoaluminum compound having the formula:

$$R_3^1Al \text{ or } R_n^1AlY_{3-n}$$

wherein $R^1$ is a $C_{1-20}$ alkyl group, Y is a $C_{1-20}$ alkoxyl, aryloxy or cycloalkoxyl group or a halogen, and $1 \leq n < 3$, wherein, when the first organoaluminum compound has the formula $R_n^1AlY_{3-n}$, the atomic ratio of gram atoms of aluminum in said compound multiplied by n, to the gram atoms of titanium in the titanium compounds falls within a range of $$0.1 \times n/(n-0.5) \leq (n \times Al)/Ti \leq 100 \times n/(n-0.5)$$

and wherein, when the first organoaluminum compound has the formula $R_3^1Al$ and the atomic ratio of gram atoms of aluminum in said organoaluminum compound multiplied by 3, to the gram atoms of titanium in the titanium compounds falls within a range of $$0.12 \leq (3 \times Al)/Ti \leq 120;$$

then (iv) at least one polysiloxane or silane compound, wherein said polysiloxane has the formula:

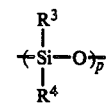

wherein $R_3$ and $R^4$ are the same or different and are $C_{1-12}$ alkyl, $C_{1-12}$ aryl, hydrogen, halogen, $C_{1-12}$ alkoxyl, $C_{1-12}$ allyloxyl, or $C_{1-12}$ fatty acid, with the proviso that $R^3$ and $R^4$ cannot both be hydrogen or halogen, and wherein p ranges from about 2 to 10,000; and wherein said silane has the formula:

where $R_s^5$ are groups capable of bonding to silicon which are $C_{1-12}$ alkyl, $C_{1-12}$ aryl, $C_{1-12}$ alkoxyl, $C_{1-12}$ allyloxyl, or $C_{1-12}$ fatty acid; X is halogen; q, s, and t are integers not smaller than 0; and r is a natural number related to q, s and t as $q+s+t=2r+2$, wherein the amount of said polysiloxane or silane compound is selected such that the atomic ratio of gram atoms of magnesium in the magnesium compounds to the gram atoms of silicon in the silicon compounds lies within a range of $1/20 \leq Mg/Si \leq 100$; and then (v) at least one second aluminum compound having the formula:

wherein $R^6$ is a $C_{1-20}$ hydrocarbon, X is a halogen atom and $0 \leq Z < 3$, wherein the amount of said second aluminum compound is such that the atomic ratio of gram atoms of aluminum in the first organoaluminum compound to the gram atoms of aluminum in the second aluminum compound falls within a range of $1/20 \leq Al$ (first organoaluminum compound)/Al (second aluminum compound) $\leq 10$;

and ingredient (B) is an organometallic compound containing a metal from group Ia, IIa, IIb, IIIb or IVb of the Periodic Table.

* * * * *

UNITED STATES PATENT AND TRADEMARK OFFICE
CERTIFICATE OF CORRECTION

PATENT NO. : 4,804,726
DATED : Feb. 14, 1989
INVENTOR(S) : Yozo KONDO, et al.

It is certified that error appears in the above-identified patent and that said Letters Patent is hereby corrected as shown below:

Title page:

In [73] Assignee, "Ioyo" is corrected to --Toyo--.

Signed and Sealed this

Third Day of October, 1989

Attest:

DONALD J. QUIGG

*Attesting Officer*   *Commissioner of Patents and Trademarks*